United States Patent
Liang et al.

(10) Patent No.: US 11,265,720 B2
(45) Date of Patent: Mar. 1, 2022

(54) CONNECTION ESTABLISHING SYSTEM AND METHOD FOR MESH NETWORK

(71) Applicant: WISTRON NEWEB CORPORATION, Hsinchu (TW)

(72) Inventors: Hao-Ming Liang, Hsinchu (TW); Chui-Chu Cheng, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 236 days.

(21) Appl. No.: 16/217,281

(22) Filed: Dec. 12, 2018

(65) Prior Publication Data
US 2020/0137562 A1 Apr. 30, 2020

(30) Foreign Application Priority Data
Oct. 24, 2018 (TW) .................................. 107137585

(51) Int. Cl.
*H04W 12/50* (2021.01)
*H04W 84/18* (2009.01)
(Continued)

(52) U.S. Cl.
CPC .............. *H04W 12/50* (2021.01); *H04L 9/32* (2013.01); *H04L 9/3239* (2013.01); *H04L 63/0227* (2013.01); *H04L 63/04* (2013.01); *H04L 63/08* (2013.01); *H04L 63/10* (2013.01); *H04L 69/24* (2013.01); *H04W 12/009* (2019.01); *H04W 12/033* (2021.01); *H04W 12/069* (2021.01);
(Continued)

(58) Field of Classification Search
USPC ............................................................ 726/4
See application file for complete search history.

(56) References Cited

U.S. PATENT DOCUMENTS

| 10,298,398 B2 * | 5/2019 | Deshpande ........... H04L 9/3226 |
| 2006/0039341 A1 * | 2/2006 | Ptasinski ............... H04W 24/02 370/338 |

(Continued)

FOREIGN PATENT DOCUMENTS

CN 102378174 A 3/2012

*Primary Examiner* — Sakinah White Taylor
(74) *Attorney, Agent, or Firm* — McClure, Qualey & Rodack, LLP (57) ABSTRACT

A connection establishing system and method for a mesh network is provided, the mesh network includes a first transceiver and a second transceiver, the method includes performing a secure connection procedure including: transmitting, by the second transceiver, a secure connection request signal including a identifier to the first transceiver. The first transceiver encrypts the authentication message by using a public key corresponding to the identifier to generate a secure connection response signal and transmit the same to the second transceiver, the second transceiver decrypts the secure connection response signal by a private key to generate a decryption message and transmits an association request signal including the decryption message to the first transceiver. The first transceiver receives the association request signal, and determines whether the decryption message matches with the authentication message; if so, the first transceiver is allowed to establish a secure connection with the second transceiver.

16 Claims, 8 Drawing Sheets

(51) Int. Cl.
*H04W 76/14* (2018.01)
*H04W 12/00* (2021.01)
*H04W 12/033* (2021.01)
*H04W 12/069* (2021.01)
*H04L 29/06* (2006.01)
*H04L 9/32* (2006.01)
*H04L 69/24* (2022.01)

(52) U.S. Cl.
CPC ........... *H04W 76/14* (2018.02); *H04W 84/18* (2013.01); *G05B 2219/36542* (2013.01)

(56) References Cited

U.S. PATENT DOCUMENTS

| | | | |
|---|---|---|---|
| 2007/0206537 A1* | 9/2007 | Cam-Winget | H04W 12/06 370/331 |
| 2010/0024006 A1* | 1/2010 | Kailash | H04L 63/08 726/4 |
| 2014/0215594 A1 | 7/2014 | Lambert et al. | |
| 2016/0203522 A1* | 7/2016 | Shiffert | H04W 4/021 705/14.58 |
| 2016/0267493 A1* | 9/2016 | Liu | G06K 7/10861 |
| 2017/0019873 A1* | 1/2017 | Britt | G06Q 30/0261 |
| 2017/0171204 A1* | 6/2017 | Forood | H04W 4/00 |
| 2019/0037047 A1* | 1/2019 | Shribman | H04L 63/029 |
| 2019/0052714 A1* | 2/2019 | Shin | H04W 12/06 |
| 2020/0382953 A1* | 12/2020 | Li | G06K 7/10257 |

\* cited by examiner

CONNECTION ESTABLISHING SYSTEM AND METHOD FOR MESH NETWORK

CROSS-REFERENCE TO RELATED PATENT APPLICATION

This application claims the benefit of priority to Taiwan Patent Application No. 107137585, filed on Oct. 24, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to connection establishing system and method, and more particularly to connection establishing system and method for a mesh network.

BACKGROUND OF THE DISCLOSURE

Wireless network, such as Wi-Fi, has become a ubiquitous network application technology, in which routers are generally used by people for communication or Internet access. In order to use the network without dead space, Self-Organizing Network (SON), in which routers are automatically connected to each other and coordinated to expand the coverage, has been utilized. Therefore, the routers acting as client ends will find appropriate routers for connection according to the environment.

Generally, in the wireless network connection, any brand of routers can be interconnected as long as the password is known. However, in environments where high levels of security are required, such security mechanisms are still highly risky, while hardware incompatibility issues may exist between different brands.

Therefore, how the above defects can be overcome to improve the security of the mesh network through the improvement of the security mechanism has become an important issue in the art.

SUMMARY OF THE DISCLOSURE

In response to the above-referenced technical inadequacies, the present disclosure provides a connection establishing system and method for a mesh network, which combines the existing network connection transmission procedure with an asymmetric cryptography mechanism to limit a connection to be established only by a specific access point device or router for subsequent unique functions.

In one aspect, the present disclosure provides a connection establishing method for a mesh network, the mesh network including a first transceiver and a second transceiver, and the method including: performing a secure connection procedure by the first transceiver and the second transceiver. The secure connection procedure includes: configuring the second transceiver to transmit a secure connection request signal to the first transceiver, wherein the secure connection request signal includes an identifier; configuring the first transceiver to receive the secure connection request signal, and encrypt an authentication message with a public key corresponding to the identifier to generate a secure connection response signal to be transmitted to the second transceiver; configuring the second transceiver to receive the secure connection response signal, decrypt the secure connection response signal by a private key to generate a decryption message, and transmit an association request signal including the decryption message to the first transceiver; configuring the first transceiver to receive the association request signal, and determine whether the decryption message matches with the authentication message; in response to determining that the decryption message matches with the authentication message, configuring the first transceiver to generate an authorization response message and transmit an association response signal including the authorization response message to the second transceiver, while allowing the first transceiver to establish a secure online connection with the second transceiver; and configuring the second transceiver to receive the association response signal and establish the secure online connection with the second transceiver.

In another aspect, the present disclosure provides a connection establishing system for a mesh network, the system including a first transceiver and a second transceiver. The first transceiver and the second transceiver are configured to perform a secure connection procedure by transmitting a secure connection request signal from the second transceiver to the first transceiver, and the secure connection request signal includes an identifier. The first transceiver is further configured to receive the secure connection request signal, and encrypt an authentication message with a public key corresponding to the identifier to generate a secure connection response signal to be transmitted to the second transceiver. When the second transceiver receives the secure connection response signal, the second transceiver is configured to decrypt the secure connection response signal by a private key to generate a decryption message, and transmit an association request signal including the decryption message to the first transceiver. When the first transceiver receives the association request signal, the first transceiver is configured to determine whether the decryption message matches with the authentication message, in response to determining that the decryption message matches with the authentication message, the first transceiver is configured to generate an authorization response message and transmit an association response signal including the authorization response message to the second transceiver, while a secure online connection is allowed to be established between the first transceiver and the second transceiver. When the second transceiver receives the association response signal, the second transceiver is configured to establish the secure online connection with the first transceiver.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the "connection establishing system and method for a network" disclosed in the present disclosure are described below by way of specific embodiments, and those skilled in the art can understand the advantages and effects of the present disclosure from the disclosure of the present specification. The present disclosure can be implemented or applied in various other specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosed content is not intended to limit the scope of the present disclosure.

It should be understood that, although the terms "first", "second", "third", and the like may be used herein to describe various elements or signals, however, these elements or signals are not limited by these terms. These terms are primarily used to distinguish one element from another or one signal from another. In addition, the term "or" as used herein may include a combination of any one or more of the associated listed items, depending on the actual situation.

Figure 1:
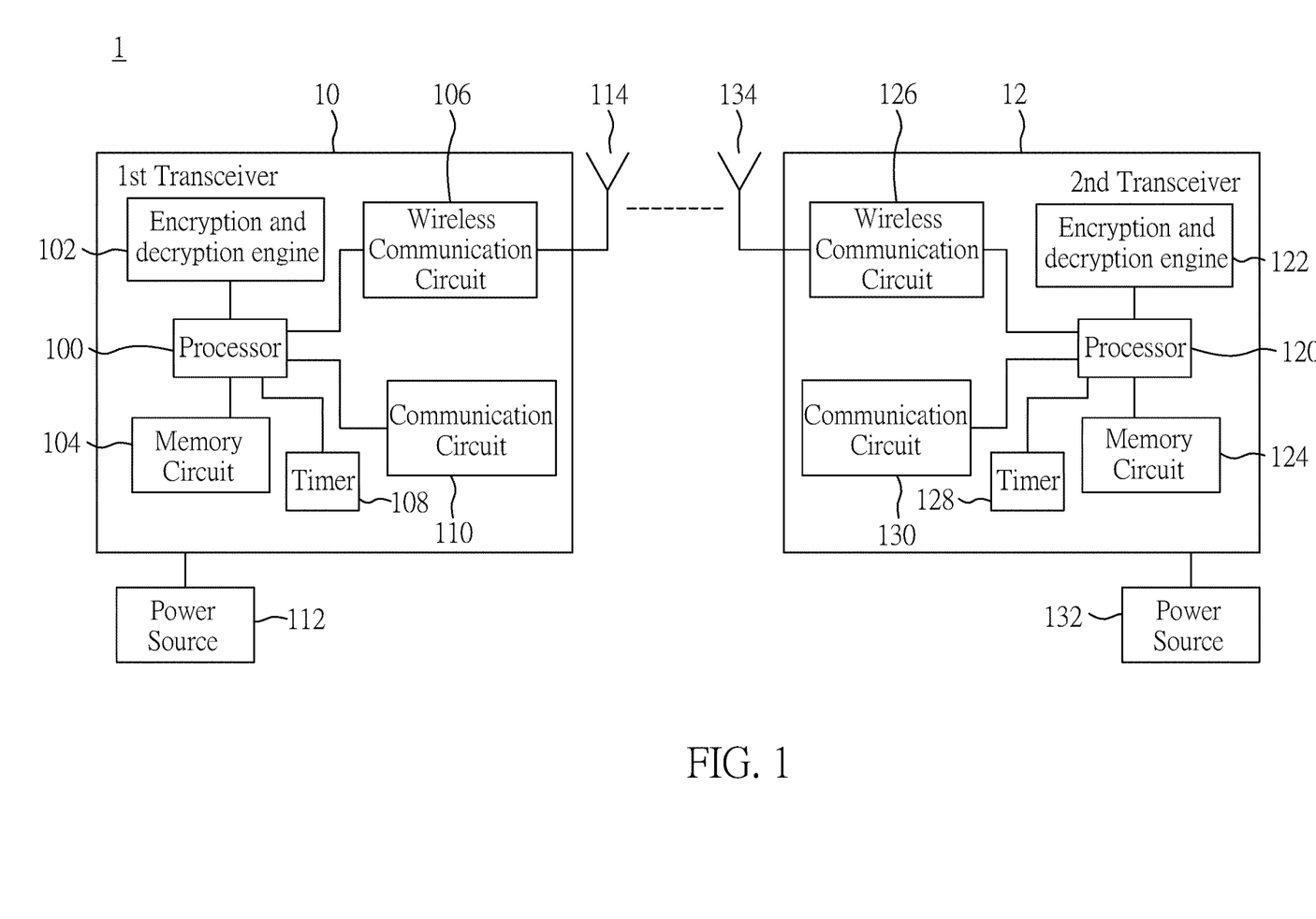
FIG. 1 is a block diagram of a connection establishing system for a mesh network according to an embodiment of the present disclosure.

As shown in FIG. 1, the present disclosure provides a connection establishing system 1 for a mesh network, the system includes a first transceiver 10 and a second transceiver 12. The first transceiver 10 and the second transceiver 12 can respectively play the role of a server end and a client end in the mesh network. For example, when routers are utilized to implement the architecture, one of the routers is allowed to be interconnected with the accredited routers, so that a reliable authentication procedure should be established for the connection between the mutually accredited routers. In this network architecture, some routers can be access points acting as roles of server, while some routers can be client ends to be connected with the access points.

The first transceiver 10 may include a processor 100, an encryption and decryption engine 102, a memory circuit 104, a wireless communication circuit 106, a timer 108 and a communication circuit 110 as shown in FIG. 1, and the first transceiver 10 is powered via a power source 112. Similarly, the second transceiver 12 can also include a processor 120, an encryption and decryption engine 122, a memory circuit 124, a wireless communication circuit 126, a timer 128, and a communication circuit 130 as shown in FIG. 1, and the second transceiver 12 is powered by a power source 132.

The processor 100, 120 can be a programmable unit, such as a microprocessor, a microcontroller, a digital signal processor (DSP) chip, a field-programmable gate array (FPGA), etc. The functionality of the processor can also be implemented by one or several electronic devices or ICs. In other words, the functions performed by the processor can be implemented in a hardware domain or a software domain or a combination of a hardware domain and a software domain.

The memory circuits 104, 124 may include flash memory, random access memory (RAM), read only memory (ROM), erasable programmable read-only memory (EPROM), electronic erasable rewritable read-only memory (EEPROM), or other memory technology, other optical storage, magnetic cassette, magnetic tape, disk storage or other magnetic storage device, or may any other medium used to store the required information and may be accessed by the processor 100, 120. The flash memory can be used to store firmware, system configuration and keys, which can be copied to random access memory during the system initialization. The random access memory stores instructions and data at runtime, and values thereof can be changed based on the execution result.

The processors 100 and 120 are configured to respectively control the wireless communication circuits 106 and 126 and the communication circuits 110 and 130 to coordinate the operation of the circuits. Specifically, the wireless communication circuits 106 and 126 may each include a 5G/2.4G Wi-Fi controller with a built-in 5G/2.4G WIFI processing unit, and a 5G/2.4G antenna interface is also provided, so as to support Wi-Fi-based communication. The antenna 114 and the antenna 134 are used to enhance the ability to transmit and receive 5G/2.4G Wi-Fi signals. In particular, the antennas 114, 134 can be adjusted to be provided with different frequencies, such that the WIFI signal sent by the WIFI processing unit can cover a wider range and can receive WIFI signals transmitted over a longer distance, specifically, the antennas 114 and 134 can be 5G/2.4G antennas. The wireless communication circuits 106 and 126 are responsible for the transmission and reception of all wireless signals, including data and management signal groups, for example, the management signal groups may include beacon signals, probe request signals, probe response signals, association request signals, association response signals and the like.

On the other hand, the communication circuits 110 and 130 can each include Ethernet network controllers connecting to the Internet via an Ethernet interface, or connecting to the Internet via wide area network (WAN) of 3G/4G/5G the communication circuits 110 and 130 can provide capabilities for connecting to the network when the first transceiver 10 and the second transceiver 12 are used as access points.

For general Wi-Fi network connections, IEEE 802.11 has established a standard procedure, which is basically a connection process between an access point and a client base station. Here, the access point first transmits the beacon signal regularly, then the client device detects which access points in the environment can be connected. When the appropriate access point is found, a probe request signal is transmitted, and the access point responds with a probe response signal. Afterward, a series of Wi-Fi connection process are launched, such as authentication process and association process, and data can be transmitted once the connection is successfully established.

In this case, in the existing connection mechanism, any brand of routers can be interconnected as long as the password is known. One object of the connection establishing system for the mesh network of the present disclosure is to combine such transmission procedure with asymmetric cryptography mechanisms, such as SSH, TLS, while appending authentication data, in order to limit a connection to be established only by a specific self-organized network for subsequent unique functions.

Figure 2:
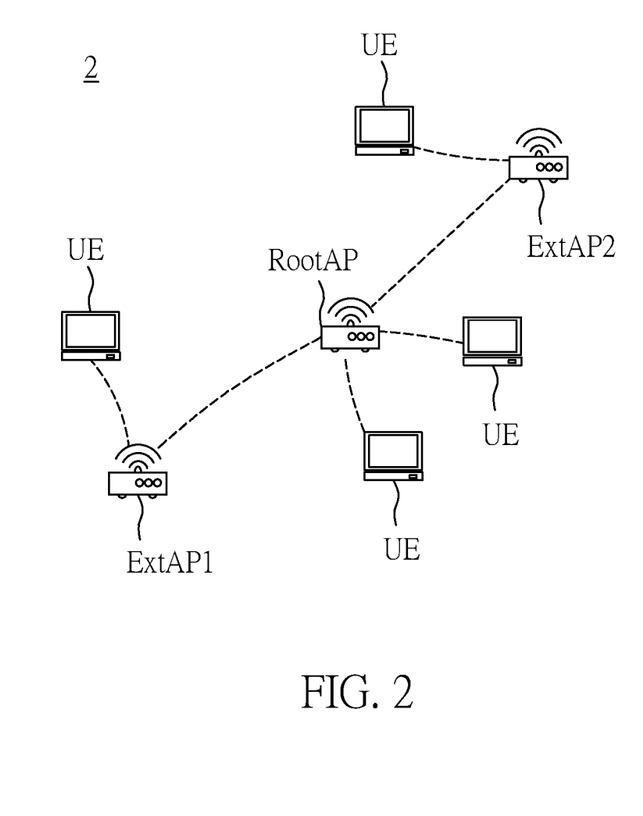
FIG. 2 is a schematic diagram of a mesh network according to an embodiment of the present disclosure.

The following description of the present disclosure takes SSH as an example. Reference is now made to FIG. 2, which is a schematic diagram of a mesh network according to an embodiment of the present disclosure. Here, a mesh network 2 can be a self-organizing network as well, in other words, each of routers in the mesh network 2, whether as a client end or a server end, has capabilities of self-configuration, self-optimization and self-healing. In detail, when deploying a mesh network, the self-configuration mechanism can automatically download the appropriate initialization parameters and launch a connection with a core network according to a network planning and a network topology of the area. The process of repeating manual configurations by engineers can be reduced by automatically configuring the parameters and the automatic detection. In the operation of the mesh network, the self-optimization mechanism can immediately make corresponding dynamic setting adjustment according to the network condition, thereby minimizing power consumption, signal interference, and reducing misjudgments during the handoff process. When encountering equipment malfunctions caused by natural or man-made disasters, such as equipment shutdown, system anomalies, parameter errors, and the like, the self-healing mechanism enables neighboring base stations to provide immediate assistance, cross-regional support, and enable the erroneous base station to quickly eliminate the corresponding faults and resume normal working status as soon as possible.

As shown in FIG. 2, in the mesh network 2, an access point RootAP, a plurality of extender access points ExtAP1, ExtAP2, and a plurality of user equipment UE are provided. Here, the root access point RootAP plays a role of the access point, which may be a server end in the SSH authentication procedure. The extender access points ExtAP1 and ExtAP2 play roles of client ends, which may be client ends in the SSH authentication procedure.

In detail, SSH is a well-known security authentication protocol that implements identity verification with the asymmetric cryptography. The authentication simply encrypts the network connection with paired public and private keys, and password authentication is used to log in. The public key needs to be stored in the device to be accessed, and the corresponding private key needs to be properly kept by the client end, and will not be transferred to the network. The authentication process is performed by a comparison based on the generated private key encryption information, and the authentication is determined to be successful if the private key encryption information is matched.

In order to speed up the encryption and decryption procedures, the encryption and decryption engine 102 and 122 are used in the first transceiver 10 and the second transceiver 12, respectively, such that the encryption procedure can be performed when any one of the first transceiver 10 and the second transceiver 12 acts as the server end, and the decryption procedure can be performed when any one of the first transceiver 10 and the second transceiver 12 acts as the client end. In the embodiment of the present disclosure, the encryption and decryption engines 102 and 122 can each be implemented in the form of hardware, software or firmware, if the encryption and decryption engine 102 and 122 are implemented in the manner of software, the memory circuit 104 and 124 may include a program code of the encryption and decryption engines 102 and 122, and the code can be executed by the processors 100 and 120.

Figure 3:
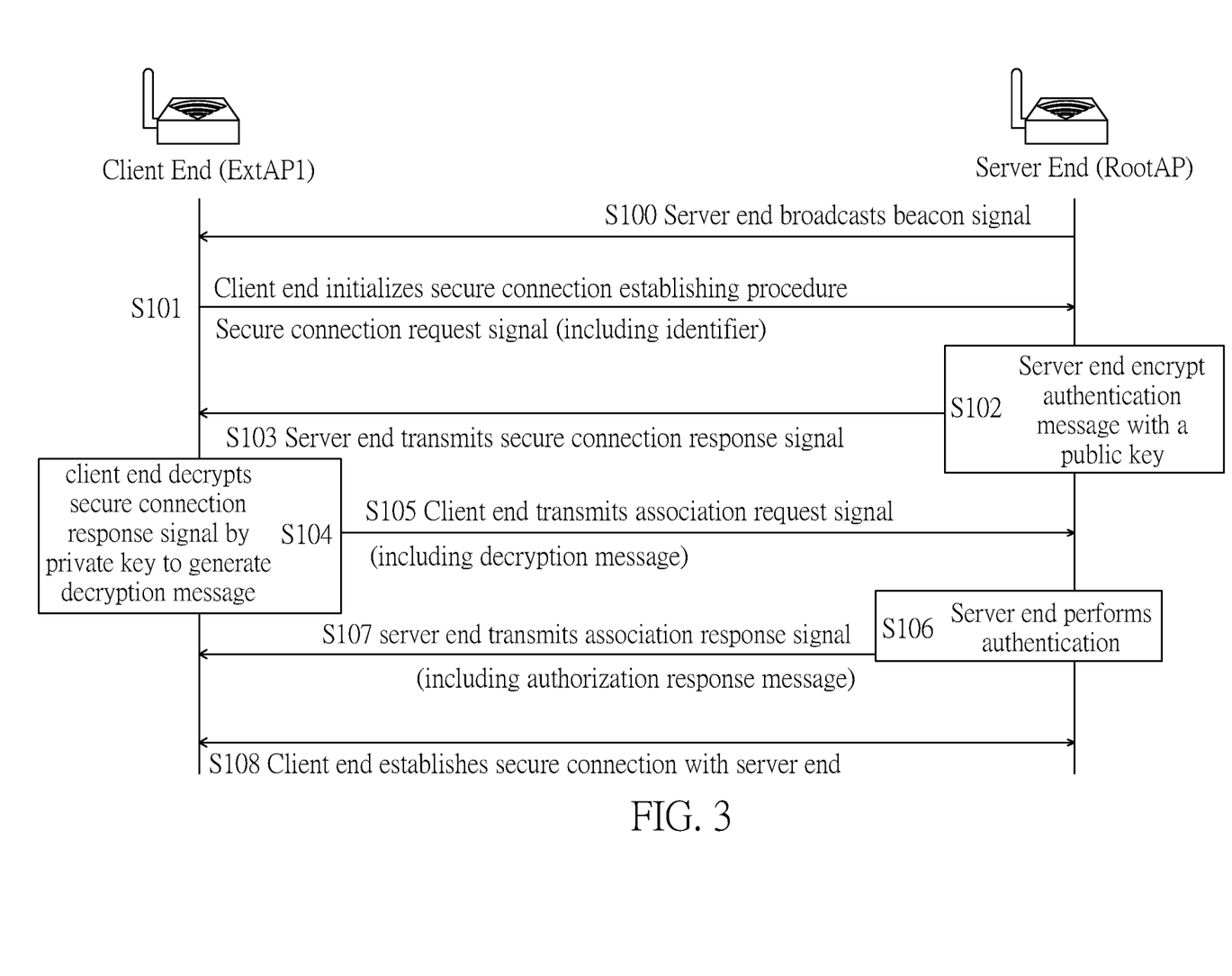
FIG. 3 is a packet transmission flow chart of the connection establishing system according to an embodiment of the present disclosure.

Reference is now made to FIG. 3, which is a packet transmission flow chart of the connection establishing system according to an embodiment of the present disclosure. Hereinafter, the connection establishing method for the mesh network of the present disclosure is described. In this embodiment, the connection establishing method for the mesh network is mainly applicable to the embodiment of the connection establishing system for the mesh network mentioned above, and the first transceiver 10 acts as the server end, the second transceiver 12 acts as the client, but the present disclosure is not limited thereto. The method provided by this embodiment can also be applied to any of the embodiments described above, in a manner or a variety of possibilities that can be envisioned by one of ordinary skill in the art.

Figure 4:
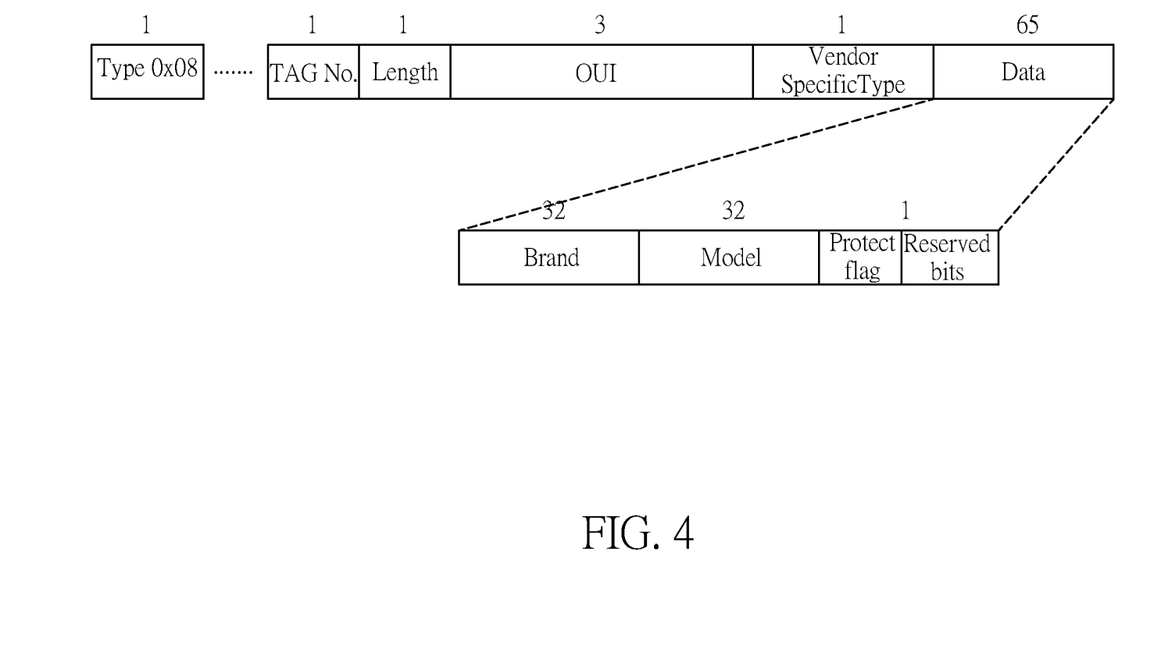
FIG. 4 shows an example of a specification of a beacon signal according to an embodiment of the present disclosure.

As shown in FIG. 3, the connection establishing method for the mesh network of the present disclosure includes the following steps:

Step S100: a server end, such as the root access point ROOTAP, is configured to broadcast a beacon signal, such that the access point can be detected by devices in a connection environment. Here, a specification of the beacon signal can be referred to in FIG. 4, which shows an example of a specification of a beacon signal according to an embodiment of the present disclosure. The number above the beacon signal represents the length of the information, which can include a beacon (Type 0x08 represents that the signal type is of a beacon), a tag number, a length, and an organizational unique identifier (OUI), a vendor specific type, data, and the like. The data can include a brand, a model, a protection flag message and reserved bits. When the client end receives the beacon signal, the client end can be configured to determine whether to perform a secure connection procedure according to the protection flag message.

Figure 5:
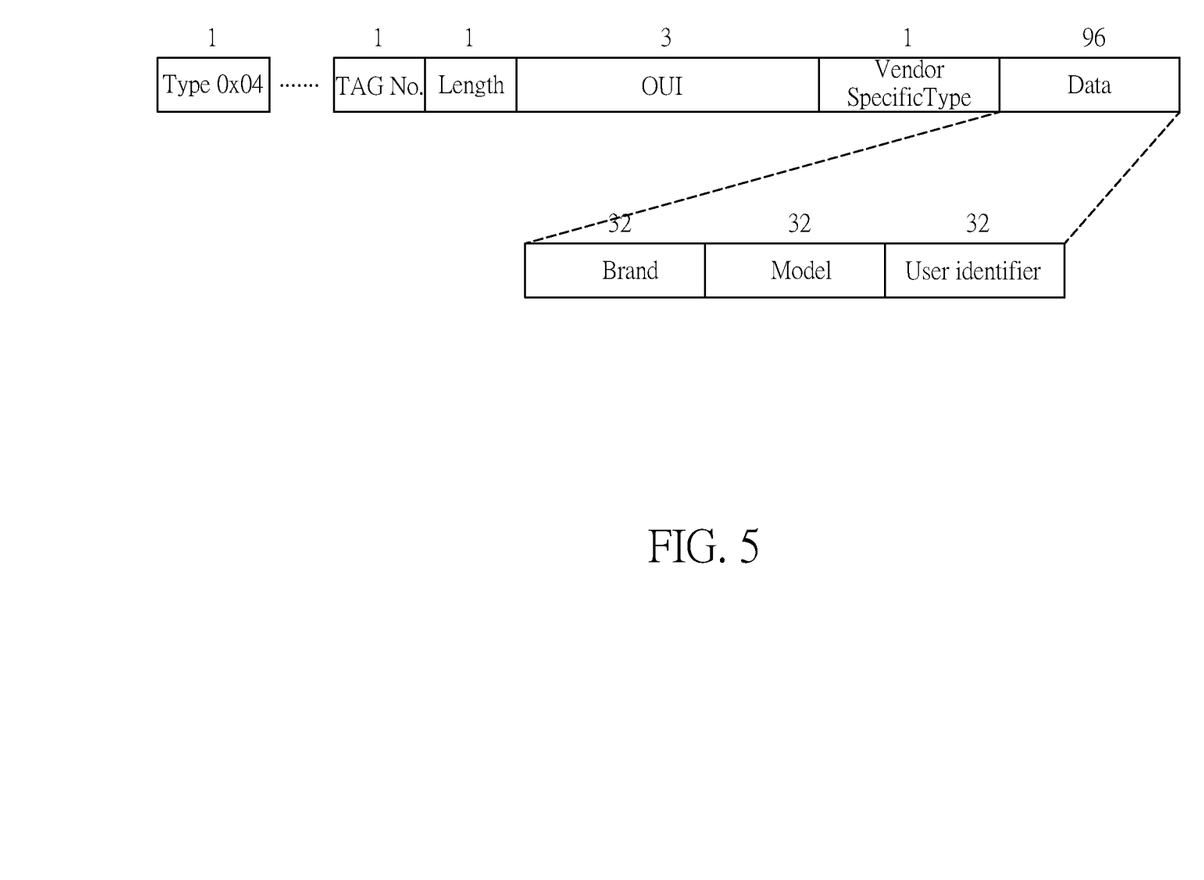
FIG. 5 shows an example of a specification of a secure connection request signal according to an embodiment of the present disclosure.

Step S101: The client end, such as the extender access point ExtAP1, is configured to initialize the secure connection establishing procedure and transmit the secure connection request signal to the server end. The secure connection request signal includes an identifier, which may be at least one of a user identifier, a client device brand, and a client device model, and which has one of a kind uniqueness. A specification of the beacon signal can be referred to in FIG. 5, which shows an example of a specification of a secure connection request signal according to an embodiment of the present disclosure. The number above the secure connection request signal represents the length of the information, which may include a secure connection request signal (Type 0x04 represents that the signal type is of a secure connection request signal), a tag number, a length, an organizationally unique identifier (OUI), a vendor specific type, data, etc. The data may include a brand, a model, and a user ID.

Figure 6:
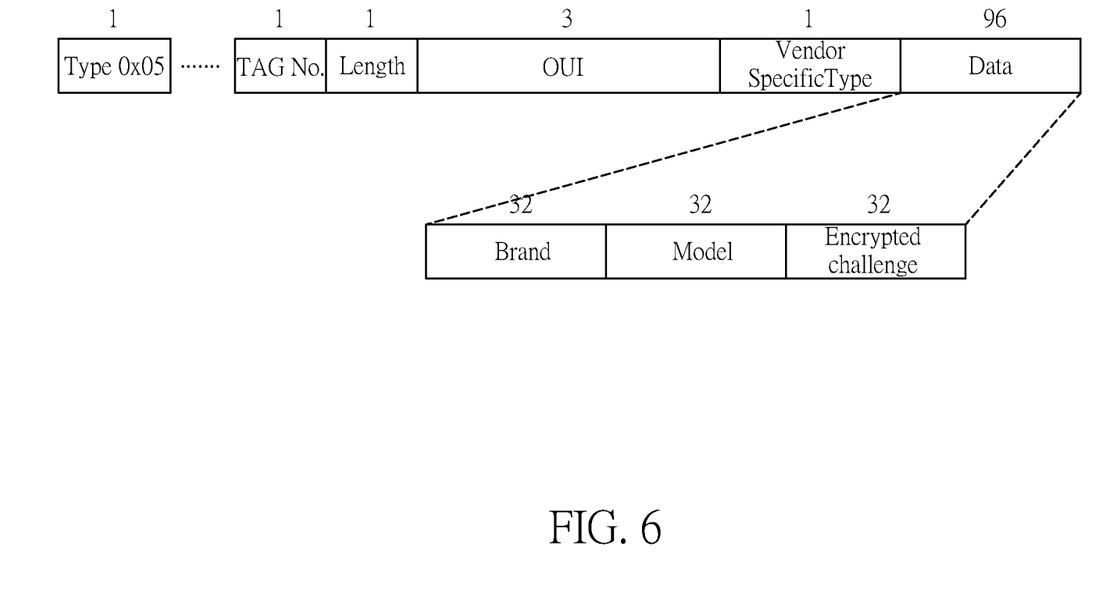
FIG. 6 shows an example of a specification of a secure connection response signal according to an embodiment of the present disclosure.

Step S102: The server end is configured to receive the secure connection request signal, and encrypt an authentication message with a public key corresponding to the identifier to generate a secure connection response signal. The authentication message can be a random message or a sequence of messages generated by a sequence algorithm, which includes an MD5 message digest algorithm and a secure hash algorithm (SHA). A specification of the secure connection response signal can be referred to in FIG. 6, which shows an example of a specification of a secure connection response signal according to an embodiment of the present disclosure. The number above the secure connection response signal represents the length of the message, which may include a secure connection response signal (Type 0x05 represents that that the signal type is of a secure connection response signal), a tag number, a length, an organizationally unique identifier (OUI), a vendor specific type, data, etc. The data may include a brand, a model, and an encrypted challenge signal. The encrypted challenge signal may include an authentication message encrypted by the public key.

For example, the identifier in the present step can include the user ID mentioned above, and has one of a kind uniqueness. On the other hand, when the user ID is a serial number, the identifier may further include a brand or a model, s that the identifier is provided with one of a kind uniqueness. In addition, the server end can locally store a comparison table, which defines the correspondence between the identifier and the public key, and the comparison table can also be stored in a cloud server, and when the server end receives the secure connection request signal, the public key can be obtained from the cloud server for encryption. Similarly, the brand, the model, and the user ID can be stored locally or in the cloud server.

Step S103: The server end is configured to transmit a secure connection response signal to the client end.

Figure 7:
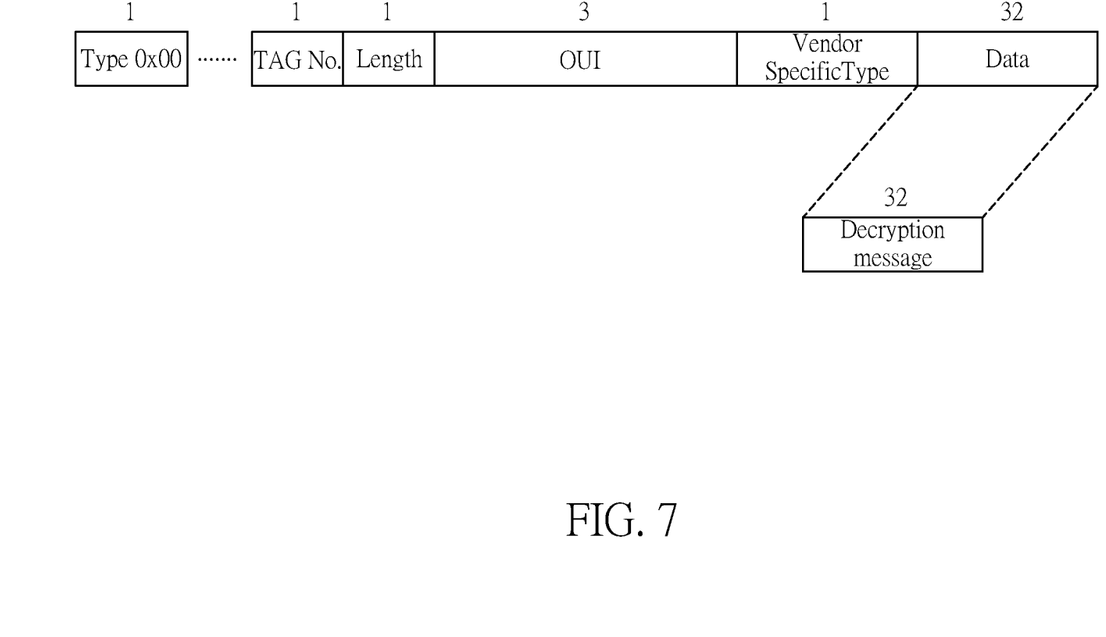
FIG. 7 shows an example of a specification of an association request signal according to an embodiment of the present disclosure.

Step S104: When the client end receives the secure connection response signal, the client end is configured to decrypt the secure connection response signal by a private key to generate a decryption message, and generate an association request signal including the decryption message. Here, the private key corresponds to the public key and can be generated by an asymmetric cryptography mechanism. For example, asymmetric cryptography mechanisms include Secure Shell (SSH) protocol and Transport Layer Security (TLS) protocol. A specification of the association request signal can be referred to in FIG. 7, which shows an example of a specification of the association request signal according to an embodiment of the present disclosure. The number above the association request signal represents the length of the information, which may include a secure connection request signal type (Type 0x00 represents that the signal type is of an association request signal), a tag number, a length, an organizationally unique identifier (OUI), a vendor specific type, data, etc. The data may include a decryption message.

Step S105: The client end is configured to transmit the association request signal including the decryption message to the server end.

Step S106: When the server end receives the association request signal, an authentication is performed by determining whether the decryption message matches with the authentication message. If the decryption message matches with the authentication message, the method proceeds to step S107, the server end is configured to generate an authorization response message, and transmits the association request signal including the authorization response message to the client.

Step S108: When the client device receives the association response signal, the client end is configured to establish a secure connection with the server end.

In this embodiment, although the root access point ROOTAP serves as the server end, and the extender access point ExtAP1 serves as the client end, the present disclosure is not limited to this. As shown in FIG. 2, the extender access points ExtAP1 and ExtAP2 can also be used as the server end, and can be configured to establish a secure online program with other extender access points serving as client end.

In this way, the connection establishing system and method for the mesh network of the present disclosure provide high level of security by allowing a trusted router to be interconnected with the self-organizing network, and the public key-private key pair generated by the asymmetric cryptography are utilized for identifying the approved router for subsequent unique functions, while avoiding hardware incompatibilities between different brands. In addition, the present disclosure also utilizes the existing authentication mechanism of the existing router, so that useless signals will not be introduced to cause unnecessary load.

Figure 8:
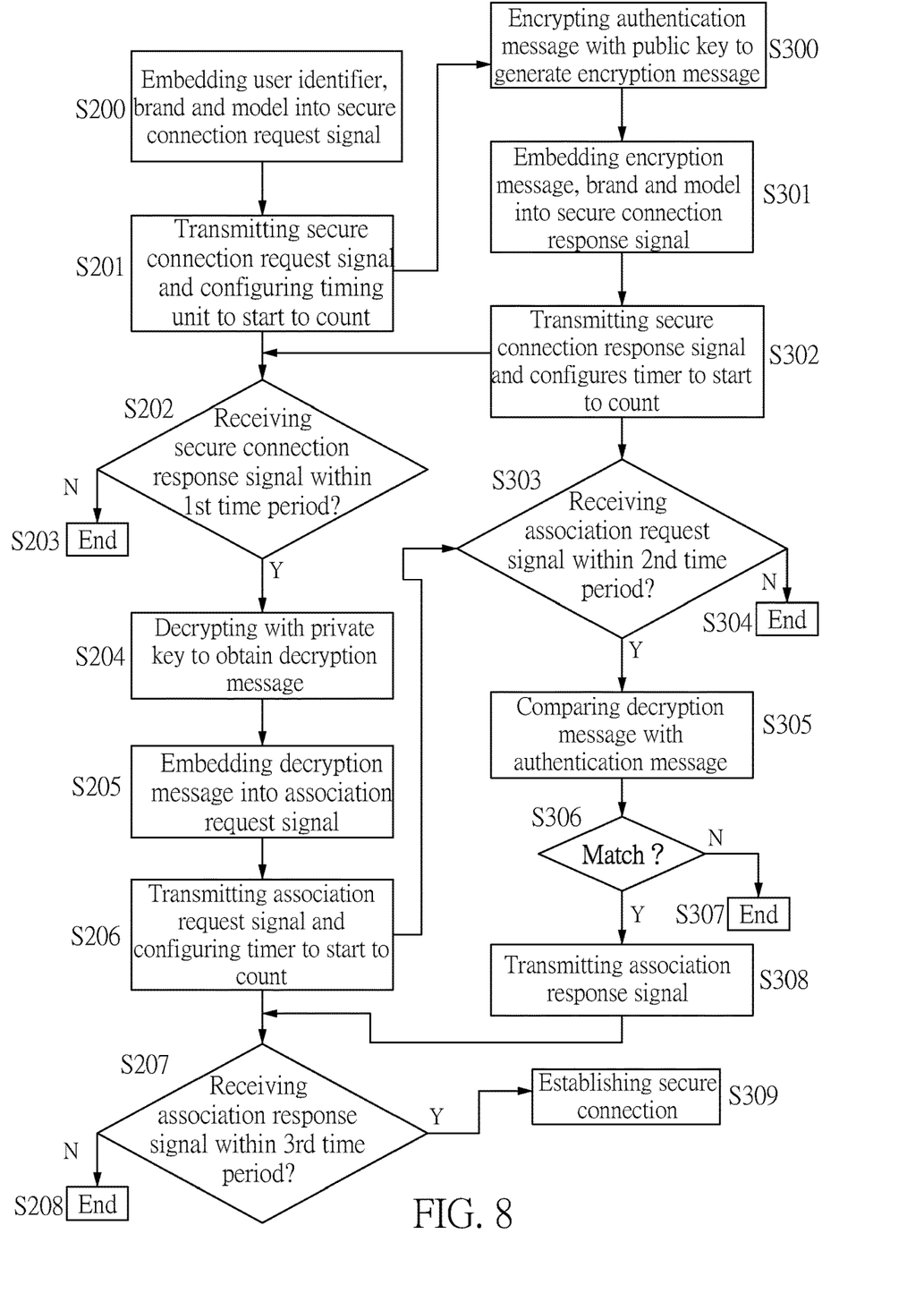
FIG. 8 is a flowchart of a connection establishing method for a mesh network according to another embodiment of the present disclosure.

Reference is now made to FIG. 8, which is a flowchart of a connection establishing method for a mesh network according to another embodiment of the present disclosure. Another embodiment of the present disclosure provides a connection establishing method for a mesh network, which includes at least the following steps:

Step S200: The client end is configured to embed a user identifier, a brand and a model into the secure connection request signal.

Step S201: The client end transmits the secure connection request signal, and configures a timer to start counting. The timer, such as the timer 128, can be built into the processor 120 of the second transceiver 12 of the aforementioned embodiment.

Step S202: The client end is configured to determine whether the secure connection response signal is received within a first time period.

On the other hand, when the server end receives the secure connection request signal, the method proceeds to step S300, in which the server end encrypts an authentication message with the public key to generate an encryption message.

Step S301: The server end further embeds the encryption message, the brand, and the model into a secure connection response signal.

Step S302: The server end transmits the secure connection response signal, and configures a timer to start counting. This timer, such as the timer 108, can be built into the processor 100 of the first transceiver 10 of the aforementioned embodiment.

Step S303: The server end is configured to determine whether an association request signal is received within a second time period.

Following the step S202, if the client end does not receive the secure connection response signal within the first time period, the method proceeds to step S203, in which the secure connection procedure is terminated. If the client end receives the secure connection response signal, the method proceeds to step S204, in which the private key is used to decrypt the secure connection response signal to obtain a decryption message.

Step S205: The client end embeds the decryption message into the association request signal.

Step S206: The client end transmits the association request signal, and configures the timer to start to count. For example, the timer can be the timer 108 of the first transceiver 10.

Step S207: The client end is configured to determine whether an association response signal is received in a third time period.

Following the step S202, if the server end does not receive the association request signal within the second time period, the method proceeds to step S304, in which the secure connection procedure is terminated. If the server end receives the association request signal within the second time period, the method proceeds to step S305, in which the decryption message in the association request signal is compared with a random message.

Step S306: The server end is further configured to determine whether the encryption message matches with the random message. If the encryption message does not match to the random message, the method proceeds to step S307, in which the secure connection procedure is terminated. If the encryption message matches with the random message, the method proceeds to step S308, in which the server end transmits an association response signal.

Following step S207, if the client end does not receive the association response signal within the third time period, the method proceeds to step S208, in which the secure connection procedure is terminated. If the client end receives the association response signal within the third time period, the method proceeds to step S309, in which the client end establishes a secure connection with the server end.

From above, in the connection establishing system and method for the mesh network of the present disclosure, high level of security can be provided by allowing the trusted router to be interconnected with the self-organizing network, and the public key-private key pair generated by the asymmetric cryptography are utilized for identifying the approved router for subsequent unique functions, while avoiding hardware incompatibilities between different brands. In addition, the present disclosure also utilizes the existing authentication mechanism of the existing router, so that useless signals will not be introduced to cause unnecessary load.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A connection establishing method for a mesh network, the mesh network includes a first transceiver and a second transceiver, and the method comprising:
    performing a secure connection procedure by the first transceiver and the second transceiver, wherein the secure connection procedure includes:
        configuring the second transceiver to transmit a secure connection request signal to the first transceiver, wherein the secure connection request signal includes an identifier having one of a kind uniqueness;
        configuring the first transceiver to receive the secure connection request signal, obtain a public key corresponding to the identifier from a comparison table, and encrypt an authentication message with the public key to generate a secure connection response signal to be transmitted to the second transceiver, wherein the comparison table defines a correspondence between the public key and the identifier;
        configuring the second transceiver to receive the secure connection response signal, decrypt the secure connection response signal by a private key to generate a decryption message, and transmit an association request signal including the decryption message to the first transceiver;
        configuring the first transceiver to receive the association request signal, and determine whether the decryption message matches with the authentication message;
        in response to determining that the decryption message matches with the authentication message, configuring the first transceiver to generate an authorization response message and transmit an association response signal including the authorization response message to the second transceiver, while allowing the first transceiver to establish a secure connection with the second transceiver; and
        configuring the second transceiver to receive the association response signal and establish the secure connection with the second transceiver,
    wherein the secure connection procedure further includes:
        configuring the second transceiver to embed a brand and a model into the secure connection request signal; and
        configuring the first transceiver to embed the brand and the model into the secure connection response signal.

2. The connection establishing method for the mesh network according to claim 1, wherein the authentication message is a random message.

3. The connection establishing method for the mesh network according to claim 1, wherein the authentication message is a sequence of messages generated by a sequence algorithm, which includes an MD5 message digest algorithm and a secure hash algorithm (SHA).

4. The connection establishing method for the mesh network according to claim 1, wherein the secure connection procedure further includes: configuring the first transceiver to broadcast a beacon signal including a protection flag message; configuring the second transceiver to receive the beacon signal; and configuring the second transceiver to determine whether to perform the secure connection procedure according to the protection flag message, wherein the second transceiver is further configured to determine whether to incorporate the identifier into the security connection request signal for transmission according to the protection flag message.

5. The connection establishing method for the mesh network according to claim 1, wherein the secure connection procedure further includes:
configuring a timer of the second transceiver to start counting after the second transceiver transmits the secure connection request signal, wherein in response to determining that the secure connection response signal is not received within a first time period, the secure connection procedure is terminated.

6. The connection establishing method for the mesh network according to claim 1, wherein the secure connection procedure further includes:
configuring a timer of the first transceiver to start counting after the first transceiver transmits the secure connection response signal, wherein in response to determining that the association request signal is not received within a second time period, the secure connection procedure is terminated.

7. The connection establishing method for the mesh network according to claim 6, wherein the secure connection procedure further includes:
configuring the timer of the first transceiver to start counting after the second transceiver transmits the association request signal, wherein in response to determining that the association response signal is not received within a third time period, the secure connection procedure is terminated.

8. The connection establishing method for the mesh network according to claim 1, wherein the first transceiver is a root access point or an extender access point in a self-organization network, and the transceiver is an extender access point or a user device in the self-organization network.

9. A connection establishing system for a mesh network, comprising:
a first transceiver; and
a second transceiver, wherein the first transceiver and the second transceiver are configured to perform a secure connection procedure by transmitting a secure connection request signal from the second transceiver to the first transceiver, wherein the secure connection request signal includes an identifier having one of a kind uniqueness,
wherein the first transceiver is configured to receive the secure connection request signal, obtain a public key corresponding to the identifier from a comparison table, and encrypt an authentication message with the public key to generate a secure connection response signal to be transmitted to the second transceiver, wherein the comparison table defines a correspondence between the public key and the identifier;
wherein when the second transceiver receives the secure connection response signal, the second transceiver is configured to decrypt the secure connection response signal by a private key to generate a decryption message, and transmit an association request signal including the decryption message to the first transceiver;
wherein when the first transceiver receives the association request signal, the first transceiver is configured to determine whether the decryption message matches with the authentication message, in response to determining that the decryption message matches with the authentication message, the first transceiver is configured to generate an authorization response message and transmit an association response signal including the authorization response message to the second transceiver, while a secure connection is allowed to be established between the first transceiver and the second transceiver; and
wherein when the second transceiver receives the association response signal, the second transceiver is configured to establish the secure online connection with the first transceiver,
wherein the second transceiver is further configured to embed a brand and a model into the secure connection request signal, and
wherein the first transceiver is further configured to embed the brand and the model into the secure connection response signal.

10. The connection establishing system for the mesh network according to claim 9, wherein the authentication message is a random message.

11. The connection establishing system for the mesh network according to claim 9, wherein the authentication message is a sequence of messages generated by a sequence algorithm, which includes an MD5 message digest algorithm and a secure hash algorithm (SHA).

12. The connection establishing system for the mesh network according to claim 9, wherein the first transceiver is configured to broadcast a beacon signal including a protection flag message, and the second transceiver is configured to receive the beacon signal and determine whether to perform the secure connection procedure according to the protection flag message, wherein the second transceiver is further configured to determine whether to incorporate the identifier into the security connection request signal for transmission according to the protection flag message.

13. The connection establishing system for the mesh network according to claim 9, wherein the second transceiver includes a timer, which is configured to start counting after the second transceiver transmits the secure connection response signal, and in response to determining that the secure connection response is not received within a first time period, the secure connection procedure is terminated.

14. The connection establishing system for the mesh network according to claim 9, wherein the first transceiver includes a timer, which is configured to start counting after the first transceiver transmits the secure connection response signal, and in response to determining that the association request signal is not received within a second time period, the secure connection procedure is terminated.

15. The connection establishing system for the mesh network according to claim 14, wherein the timer of the first transceiver is configured to start counting after the second transceiver transmits the association request signal, and in response to determining that the secure connection response signal is not received within a third time period, the secure connection procedure is terminated.

16. The connection establishing system for the mesh network according to claim 9, wherein the first transceiver is a root access point or an extender access point in a self-organization network, and the transceiver is an extender access point or a user device in the self-organization network.

\* \* \* \* \*